US012203224B2

(12) United States Patent
Hu et al.

(10) Patent No.: US 12,203,224 B2
(45) Date of Patent: Jan. 21, 2025

(54) ASSEMBLED BAMBOO SLEEPER AND PREPARATION METHOD THEREOF

(71) Applicant: HUNAN TAOHUAJIANG BAMBOO SCIENCE & TECHNOLOGY CO., LTD., Hunan (CN)

(72) Inventors: Jinbo Hu, Hunan (CN); Jian Peng, Hunan (CN); Weihong Zeng, Hunan (CN); Yanhui Xiong, Hunan (CN); Diqin Liu, Hunan (CN); Zhicheng Xue, Hunan (CN); Xianjun Li, Hunan (CN); Zhiping Wu, Hunan (CN); Shanshan Chang, Hunan (CN); Gonggang Liu, Hunan (CN); Ting Li, Hunan (CN)

(73) Assignee: HUNAN TAOHUAJIANG BAMBOO SCIENCE & TECHNOLOGY CO., LTD., Hunan (CN)

( * ) Notice: Subject to any disclaimer, the term of this patent is extended or adjusted under 35 U.S.C. 154(b) by 846 days.

(21) Appl. No.: 17/425,333

(22) PCT Filed: Apr. 18, 2019

(86) PCT No.: PCT/CN2019/083251

§ 371 (c)(1),
(2) Date: Jul. 23, 2021

(87) PCT Pub. No.: WO2020/151104

PCT Pub. Date: Jul. 30, 2020

(65) Prior Publication Data

US 2022/0098799 A1 Mar. 31, 2022

(30) Foreign Application Priority Data

Jan. 23, 2019 (CN) ......................... 201910063407.1

(51) Int. Cl.
*E01B 3/10* (2006.01)
*B27J 1/00* (2006.01)
(Continued)

(52) U.S. Cl.
CPC *E01B 3/10* (2013.01); *B27J 1/00* (2013.01); *B27K 3/12* (2013.01); *B27K 3/16* (2013.01);
(Continued)

(58) Field of Classification Search
CPC ..... E01B 3/02; E01B 3/44; E01B 3/46; E01B 3/42; E01B 3/26; B27K 3/12; B27K 3/16;
(Continued)

(56) References Cited

U.S. PATENT DOCUMENTS 5,747,177 A * 5/1998 Torimoto ............... A63B 59/40 428/105
5,972,467 A * 10/1999 Washo ..................... B27N 3/04 144/380

(Continued)

FOREIGN PATENT DOCUMENTS

CN 101214678 A * 7/2008
CN 102672777 A * 9/2012

(Continued)

OTHER PUBLICATIONS

Xu, Youyi et al., "Self-polymerization-adhesion behavior of dopamine and surface functionalization of membranes", Membrane Science and Technology, Jun. 2011, pp. 32-38.

(Continued)

*Primary Examiner* — Zachary L Kuhfuss
*Assistant Examiner* — James William Jones
(74) *Attorney, Agent, or Firm* — JCIP GLOBAL INC.

(57) ABSTRACT

The present invention discloses an assembled bamboo sleeper, which is obtained by using a bamboo unit as a raw material, dried and modified at the temperature of 110-180°
(Continued)

C., undergone coating treatment using a dopamine solution, adhesive dipping, curing and solidifying, assembling and gluing, further solidifying, further treatment using a dopamine solution, and anti-mildew and/or anti-corrosion and/or anti-insect treatment, and then fastened. The present invention further provides a preparation method for the foregoing bamboo sleeper. The bamboo sleeper prepared in the present invention is green and environmentally friendly, and applicable for ballasted tracks of railways and urban rail transit systems.

11 Claims, 3 Drawing Sheets

(51) Int. Cl.

| | |
|---|---|
| ***B27K 3/12*** | (2006.01) |
| ***B27K 3/16*** | (2006.01) |
| ***B27K 3/32*** | (2006.01) |
| ***B27K 3/38*** | (2006.01) |
| ***B27K 9/00*** | (2006.01) |
| ***E01B 3/26*** | (2006.01) |
| ***E01B 3/42*** | (2006.01) |
| ***E01B 3/44*** | (2006.01) |
| ***E01B 3/46*** | (2006.01) |
| *B27N 1/00* | (2006.01) |
| *B27N 3/18* | (2006.01) |
| *B27N 3/20* | (2006.01) |

(52) U.S. Cl.
CPC .................. *B27K 3/32* (2013.01); *B27K 3/38* (2013.01); *B27K 9/002* (2013.01); *E01B 3/26* (2013.01); *E01B 3/42* (2013.01); *E01B 3/44* (2013.01); *E01B 3/46* (2013.01); *B27K 2240/20* (2013.01); *B27N 1/00* (2013.01); *B27N 3/18* (2013.01); *B27N 3/203* (2013.01)

(58) Field of Classification Search
CPC .......... B27K 9/002; B27N 3/203; B27N 3/18; B27N 3/002; B27N 1/00
USPC ............................................................ 238/83
See application file for complete search history.

(56) References Cited

U.S. PATENT DOCUMENTS

| | | | | |
|---|---|---|---|---|
| 11,148,318 | B2 * | 10/2021 | Wang | B27N 3/04 |
| 2003/0026942 | A1 * | 2/2003 | Hejna | B32B 21/14 427/508 |
| 2003/0150522 | A1 * | 8/2003 | Suzuki | B27N 3/143 144/380 |
| 2004/0037906 | A1 | 2/2004 | Li et al. | |
| 2012/0237720 | A1 * | 9/2012 | Djerf | B27M 3/0053 144/333 |
| 2016/0024720 | A1 * | 1/2016 | Cialone | B29C 70/025 238/85 |
| 2016/0208441 | A1 * | 7/2016 | Avraham | E01B 3/02 |
| 2016/0325530 | A1 * | 11/2016 | Slaven, Jr. | B32B 5/26 |
| 2017/0114541 | A1 * | 4/2017 | Hebel | E04C 5/168 |
| 2018/0215069 | A1 * | 8/2018 | Lewis | B32B 7/04 |

FOREIGN PATENT DOCUMENTS

| | | | | |
|---|---|---|---|---|
| CN | 102744753 | | 10/2012 | |
| CN | 103085148 | A * | 5/2013 | |
| CN | 202954271 | | 5/2013 | |
| CN | 104875270 | A * | 9/2015 | |
| CN | 104960069 | A * | 10/2015 | |
| CN | 107009457 | | 8/2017 | |
| CN | 107009457 | A * | 8/2017 | |
| CN | 107090186 | A * | 8/2017 | |
| CN | 107283588 | | 10/2017 | |
| CN | 107471386 | A * | 12/2017 | |
| CN | 108032405 | A * | 5/2018 | B27K 3/12 |
| CN | 108202378 | A * | 6/2018 | |
| CN | 108393986 | A * | 8/2018 | |
| CN | 108638251 | A * | 10/2018 | |
| EP | 1716995 | | 11/2006 | |
| JP | 2015058640 | A * | 3/2015 | |

OTHER PUBLICATIONS

"International Search Report (Form PCT/ISA/210) of PCT/CN2019/083251," mailed on Oct. 16, 2019, with English translation thereof, pp. 1-5.

"Written Opinion of the International Searching Authority (Form PCT/ISA/237) of PCT/CN2019/083251," mailed on Oct. 17, 2019, pp. 1-4.

* cited by examiner

| Serial number | Inspection items | Reference standard | Unit | Test results | Remarks |
| --- | --- | --- | --- | --- | --- |
| 1 | Density | GB/T30364-2013 | $g/cm^3$ | 1.22 | |
| 2 | UV resistance | ISO 4892-3:2016 | Gray level | level 4 | |
| | | | $\triangle E^*_{ab}$ | 1.58 | |
| 3 | Water absorption thickness expansion rate | GB/T30364-2013 | % | 1.1 | |
| 4 | Anti-skid performance | DD CEN/TS 15676-2007 | Dry state | 70 | Take the average value of 20 samples |
| 5 | Hardness | EN 1534-2010 | $N/mm^2$ | 10.06 | |
| 6 | Anti-bending elastic modulus | EN ISO 178:2010/Amd.1:2013 method A | MPa | 15900 | |
| 7 | Horizontal shear strength | GB/T30364-2013 | MPa | 22 | |

FIG. 6

ASSEMBLED BAMBOO SLEEPER AND PREPARATION METHOD THEREOF

CROSS-REFERENCE TO RELATED APPLICATION

This application is a 371 of international application of PCT application serial no. PCT/CN2019/083251, filed on Apr. 18, 2019, which claims the priority benefit of China application no. 201910063407.1, filed on Jan. 23, 2019. The entirety of each of the above mentioned patent applications is hereby incorporated by reference herein and made a part of this specification.

BACKGROUND

Technical Field

The present invention relates to the field of new materials for railways and urban rail transit systems, in particular to an assembled bamboo sleeper and a preparation method thereof.

Description of Related Art

New bamboo material is a characteristic bamboo product with bamboo instead of wood and outdoor application of green building materials in China. In recent years, through technological innovation, the production technology of the new bamboo material has become more and more mature and the quality of products thereof has become more and more stable. Besides being highly resistant to natural climate and biological erosion outdoors, the new bamboo material also has better elasticity and is more suitable for being used as a blank for railway sleepers. Bamboo resources are rich, green and sustainable, which solve the disadvantages of insufficient supply of high-quality wood for wooden sleepers and the disadvantages of endangering the environment and human health by chemicals such as creosote required for anti-corrosion treatment. It can also make up for the disadvantages of high energy consumption and unsustainable resources in the production of concrete sleepers and steel sleepers.

Wooden sleepers, concrete sleepers, steel sleepers and composite material sleepers used for ballasted tracks in existing railways have the following disadvantages: for example, wooden sleepers have short service life, are easy to wear, and have differences in mechanical properties between different wooden sleepers, and so on. Another example is the concrete sleepers, which have poor insulation, high brittleness, poor elasticity, risk of impact damage, low stability, heavy weight, difficult replacement, difficult recycling, and the like. There are also steel sleepers, which are not insulated, and have high driving noise, high rigidity, easy corrosion, and the like. There are also composite material sleepers, which are light in weight, poor holding ability of fasteners and bolts, vulnerable to environmental impacts and become brittle, or the like.

SUMMARY

The technical problem to be solved by the present invention is to overcome the disadvantages of the prior art, and provide a green and environmentally friendly assembled bamboo sleeper, suitable for ballasted tracks of railways and urban rail transit systems and a preparation method thereof.

In order to solve the above technical problems, the present invention adopts the following technical solution.

Provided is an assembled bamboo sleeper, where the bamboo sleeper is obtained by using a bamboo unit as a raw material, dried and modified at the temperature of 110-180° C., undergone coating treatment using a dopamine solution, adhesive dipping, curing and solidifying, assembling and gluing, further solidifying, further treatment using a dopamine solution, and anti-mildew and/or anti-corrosion and/or anti-insect treatment, and then fastened.

As a general inventive concept, the present invention further provides a preparation method of the assembled bamboo sleeper, including the following steps:

1) drying and modifying the pretreated bamboo unit by using water vapor with a superheat degree of 10-80° C., until a water content of the bamboo unit is 8-20%, to obtain a dried and modified bamboo unit;
2) dipping the dried and modified bamboo unit in step 1) in a dopamine solution or spraying the dopamine solution thereon, and dried, to obtain a filamentous bamboo unit undergone polydopamine coating treatment;
3) dipping the filamentous bamboo unit undergone polydopamine coating treatment in step 2) in an adhesive I to perform adhesive dipping, draining, and drying, until the water content of the bamboo unit is 10%-16%, to obtain a blank;
4) curing and solidifying the blanks in step 3), to obtain a bamboo plate;
5) assembling and gluing two or more of the bamboo plates in step 4) according to a preset requirement, assembling the bamboo plates, and solidifying, to obtain a bamboo sleeper billet;
6) coating a dopamine solution on a surface of the bamboo sleeper billet in step 5), and then performing anti-mildew and/or anti-corrosion and/or anti-insect treatment, to obtain a bamboo sleeper undergone anti-mildew and/or anti-corrosion and/or anti-insect treatment; and
7) locking and fastening the bamboo sleepers undergone anti-mildew and/or anti-corrosion and/or anti-insect treatment in step 6) by using a fastener, to obtain an assembled bamboo sleeper.

As a further improvement of the foregoing technical solution.

Preferably, the surface of a bamboo bar is flat, zigzag shaped, or joggle joint shaped.

Step 5) specifically includes: finger-jointing two or more bamboo plates in step 4) according to a preset requirement, and coating an adhesive II on upper and lower surfaces of the bamboo plates, assembling the bamboo plates, solidifying the adhesive, and then obtaining the bamboo sleeper billet.

In step 5), the billets are assembled along the direction of bamboo fibers and/or assembled in a criss-crossed manner along the direction of bamboo fibers.

The adhesive II is one of polyurethane adhesive, epoxy resin adhesive, and thermosetting reactive polyurethane resin.

In step 5), before the finger-jointing, the method further includes cutting and sanding the bamboo plates; and the bamboo plates are cut along the direction of the bamboo fibers and/or perpendicular to the direction of the bamboo fibers.

The anti-mildew and/or anti-corrosion and/or anti-insect treatment in step 6) specifically includes: coating a dopamine solution on a surface of the bamboo sleeper billet and drying, coating a titanyl sulfate solution, drying, and then coating a silver nitrate solution, and drying, to obtain the bamboo sleeper.

Step 4) specifically includes: paving and assembling the blanks in step 3), then curing and solidifying the billet by hot pressing, to obtain a bamboo plate, where the hot pressing is carried out at the pressure of 15-30 Mpa and the temperature of 120-160° C.

The hot-pressing time is t, the thickness of the bamboo plate is D, where t=D×2400, the unit oft is s, and the unit of D is mm.

The pretreating in step 1) specifically includes: removing an outer green part and an inner yellow part from the bamboo unit, steaming and softening, and then washing and grinding, to obtain the pretreated bamboo unit.

Preferably, the adhesive I is a phenolic resin or modified urea-formaldehyde resin solution with a solid content of 20%-30%.

Preferably, the adhesive dipping is an ultrasonic pulsation assisted atmospheric treatment for 15-30 min.

Preferably, during the adhesive dipping, the pressure is 0.2-0.8 MPa, and the time is 10-20 min.

Preferably, when cut along the direction of bamboo fibers, the length of the bamboo plate is 800-1600 mm, the width is above 180 mm, and the thickness is above 120 mm.

Preferably, when cut in a direction perpendicular to the direction of bamboo fibers, the length of the bamboo plate is 700-1200 mm, the width is above 180 mm, and the thickness is above 120 mm.

Preferably, in step 2) or step 6), the concentration of the dopamine solution is 0.01-1 mg/mL, and the pH value of the dopamine solution is 7-9.

Preferably, in step 6), the concentration of the titanyl sulfate solution is 0.001-1 mol/L, and the pH value is 7-10; and the concentration of the silver nitrate solution is 0.001-0.1 mol/L.

Preferably, in step 6), the dopamine solution, the titanyl sulfate solution, and the silver nitrate solution are each coated 2-4 times.

The solution for the pretreatment of steaming in step 1) is an aqueous ammonia or sodium hydroxide solution with a pH value of 8-9, and the steaming time is 1-2 h.

Preferably, the fastener is a stainless steel ferrule, and has a thickness 2-4 mm and a width of 50-60 mm.

Compared with the prior art, the advantages of the present invention are.

In the assembled bamboo sleeper and the preparation method thereof in the present invention, the bamboo units are coated with polydopamine to improve its elasticity and water resistance, glued and assemble together, and after being treated with polydopamine, subject to anti-mildew, anti-corrosion, anti-insect treatment (weather-proof treatment), to produce an assembled bamboo sleeper that can completely meet the requirements of high-value and green sleepers in track construction. For the assembled bamboo sleeper, high-temperature hydrothermal drying modification treatment degrades starch and other carbohydrate substances needed for mildew nutrition, and the decrease in the mechanical strength of the assembled bamboo sleeper due to high temperature can be improved by the polydopamine treatment. The assembled bamboo sleeper can be applied in industrialization with simple manufacturing process and low manufacturing cost.

The assembled bamboo sleeper has high density, moderate elastic modulus, anti-mildew, anti-corrosion, anti-cracking, and repeated high-strength rolling resistance. The invention of the technology provides new materials for ballasted tracks in railways and urban rail transit systems, is especially suitable for green and environmentally friendly sleepers in urban rail transit systems, and further expands the application range of the new bamboo materials.

BRIEF DESCRIPTION OF THE DRAWINGS

FIG. 6 is a test result chart of a bamboo plate.

DESCRIPTION OF THE EMBODIMENTS

The following will describe the present invention in detail in combination with the specification and the specific embodiments.

Example 1 (an Example of a Sleeper Assembled by a Plurality of Bamboo Plates Each with a Length of 2000 mm, a Width of 200 mm, and a Thickness of 160 mm)

Figure 1:
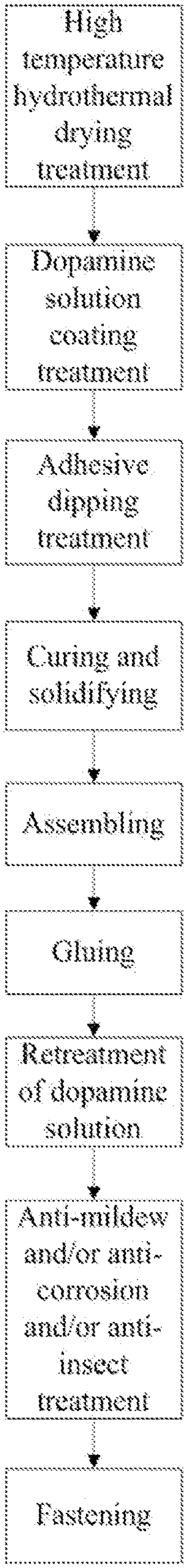
FIG. 1 is a schematic diagram of a process of the present invention.

As shown in FIG. 1, the preparation method of the assembled bamboo sleeper in this example specifically has the following steps.

(1) A 4-year raw moso bamboo was selected and cut into sections each with a length of 1900 mm±10 mm, to obtain a bamboo cylinder section.

(2) The bamboo cylinder section was cleaved, from which an outer green part and a yellow inner part were 100% removed, then placed in an ammonia liquid with a pH value of 8.5 for steaming for 30 min, and then mechanically thrashed to form a filamentous bamboo unit.

(3) The filamentous bamboo unit was subject to multi-effect treatment of being dried by a dry bulb at 150° C. and by superheat water vapor at of 30° C., until a water content of the filamentous bamboo unit was approximately 15%, to obtain a filamentous bamboo unit undergone drying and hydrothermal treatment.

(4) A 0.05 mg/mL dopamine solution (of which the pH was adjusted to 8 by adding a Tris buffer) was sprayed on the filamentous bamboo unit undergone drying and hydrothermal treatment, and the filamentous bamboo unit undergone polydopamine treatment was obtained after being naturally dried for 7 h.

(5) The filamentous bamboo unit undergone polydopamine treatment was dipped in a phenolic resin solution with a solid content of 25%, and was then subject to ultrasonic pulse assisted normal-pressure treatment for 20 min, drained, and then dried, until the water content of the filamentous bamboo unit was controlled to 15%, to obtain a blank.

In other examples, the adhesive dipping may be a treatment for 10-20 min at a pressure of 0.2-0.8 MPa, which can also achieve the same or similar technical effect.

(6) The blanks were paved and assembled, and the phenolic resin adhesive was solidified and molded by hot pressing, to obtain a bamboo plate. Hot pressing parameters were that: the pressure was 22 MPa, the temperature was 130° C., the hot-pressing time was 2400 s for the set thickness of the plate, and the size of the bamboo plate after hot pressing was 1900×1200×42 $mm^3$.

(7) The bamboo plate was mechanically sanded, and then cut into a flat slat I and a flat slat II. The flat slat I was in a direction along the direction of bamboo fibers, and the flat slat I in this example includes two parts, one of which is of a length of 1200 mm and the other one of a length of 800 mm, and both of a width of 200 mm and a thickness of 40 mm. The flat slat II is in a direction perpendicular to the direction of bamboo fibers, and in this example, the flat slat II includes two parts, one of which is of a length 1100 mm and the other one of a length of 900 mm, and both of a width of 200 mm and a thickness of 40 mm. The two parts of the flat slat I and the flat slat II are separately finger-jointed to form the required specification length of 2000 mm, to obtain the finger-jointed bamboo plate.

In this example, the surface of the bamboo plate is flat. In other examples, it can be flat, zigzag shaped or joggle joint shaped, and the same or similar technical effects can be achieved.

In this example, two parts of the flat slat I and the flat slat II are connected and assembled along the length direction. In other examples, two parts of the flat slat I and the flat slat II may be connected and assembled along the width direction.

In this example, the flat slat I and the flat slat II are each composed of two parts. In other examples, a quantity of the parts of each of the flat slat I and the flat slat II may optionally be 1, 3, 4, and other suitable quantities.

Figure 2:
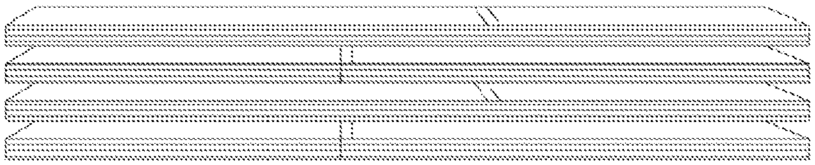
FIG. 2 is a schematic diagram of finger joint along a direction of bamboo fibers.
Figure 3:
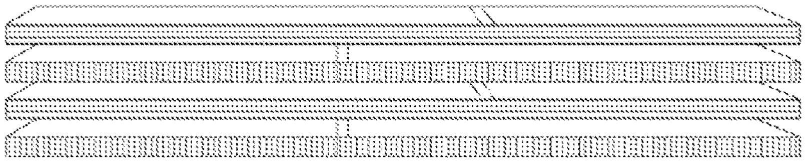
FIG. 3 is a schematic diagram of finger joint in a criss-crossed manner along a direction of bamboo fibers.

(8) A reactive polyurethane adhesive hot-dissolved at 85° C. was uniformly coated on the broad surfaces (i.e. the upper and lower surfaces) of the finger-jointed bamboo plate, and a billet was assembled in an A type (which may be replaced with a B type in other examples), and then pressured and fastened, and a bamboo plate billet can be obtained after the adhesive was cured and solidified. A type: along the direction of bamboo fibers; B type: criss-crossed along the direction of bamboo fibers, as shown in FIG. 2 and FIG. 3.

In this example, a polyurethane adhesive for outdoor long-term high-efficiency bonding is adopted. In other examples, epoxy resin adhesives or thermosetting reactive polyurethane resins can also achieve the same or similar technical effects.

(9) A surface of the blank of the bamboo sleeper was subject to dopamine solution spraying three times and anti-mildew (Ag/$TiO_2$-doped), anti-corrosion and anti-insect coating treatment three times, to obtain a bamboo sleeper undergone anti-mildew treatment. The specific steps were as follows:

(9.1) The bamboo sleeper billet was mechanically processed, repeatedly coated by a 0.05 mg/mL dopamine solution of which a pH value was adjusted to 8 by a Tris buffer solution, where each time it was required to wait for the coating layer to be dried to be an extent of non-stick in hand, and then dried at 70° C. for 40 min, to obtain a bamboo sleeper billet covered by a polydopamine membrane.

(9.2) A surface of the bamboo sleeper billet covered by the polydopamine membrane was coated by a 0.01 mol/L titanyl sulfate solution and then coated by an ammonia liquid (in other examples, a sodium hydroxide solution can be used); and the mixed liquids were coated and a pH test paper was used to measure a pH value of the surface of the bamboo sleeper billet, until the pH value was 9; and when the coating layer was non-stick in hand, the bamboo sleeper billet was dried at 70° C. for 60 min, to obtain a bamboo sleeper billet loaded with $TiO_2$.

(9.3) The bamboo sleeper billet loaded with $TiO_2$ was coated by a 0.001 mol/L silver nitrate solution three times, and after the coating layer was non-stick in hand, dried at 80° C. until a water content of the bamboo sleeper billet loaded with $TiO_2$ was approximately 10%, to obtain a bamboo sleeper undergone anti-mildew treatment.

Figure 4:
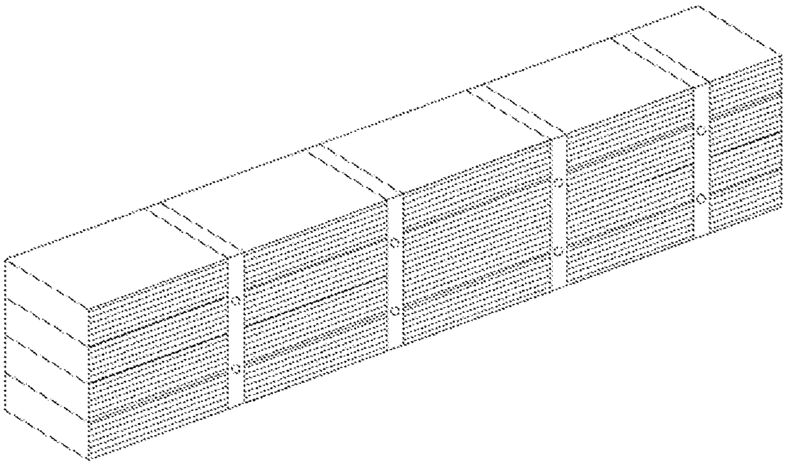
FIG. 4 is a schematic diagram of a bamboo sleeper along a direction of bamboo fibers.
Figure 5:
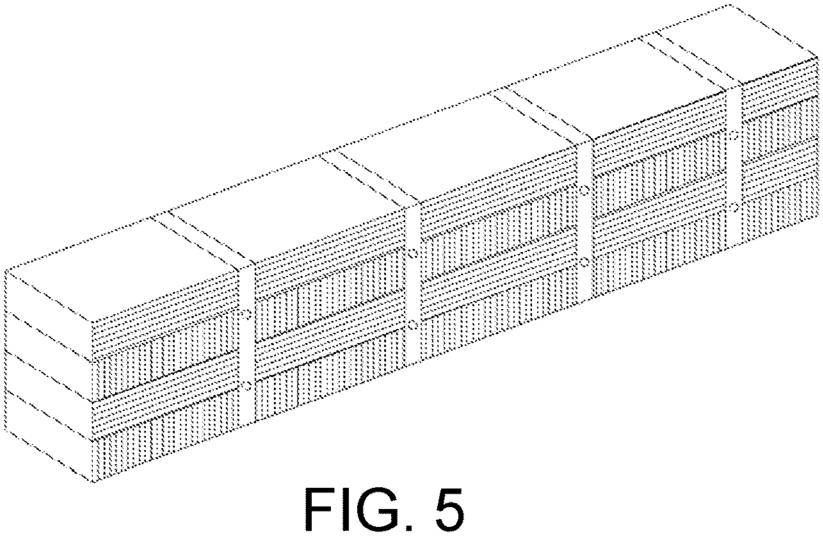
FIG. 5 is a schematic diagram of a bamboo sleeper criss-crossed along a direction of bamboo fibers.

(10) A plurality of bamboo sleepers (four bamboo sleepers in this example) undergone anti-mildew treatment were fastened by four steel ferrules each with a thickness of 2 mm and a width of 50 mm, edge portions of the steel ferrules at the left and right ends each having a distance of 150 mm with a corresponding end portion of the bamboo sleeper and edge portions of the steel ferrules each having a distance of 350 mm with a center line of the bamboo sleeper, to obtain a once-through assembled bamboo sleeper, as shown in FIG. 4 (when performing billet assembling by using the B type, the once-through assembled bamboo sleeper was shown in FIG. 5).

In this example, the thickness of the produced bamboo sleeper was 50 mm. In other examples, an ultra-thick bamboo sleeper with a thickness above 100 mm may be produced by gluing a plurality of relatively thick bamboo sleepers spliced and assembled, and then locking and connecting them together by stainless steel ferrules or fasteners made of other materials.

The specific process flow of this example is as follows:

Original bamboo cutting→cleaving→removing an outer green part and an inner yellow part→basic liquid assisted steaming and softening→washing→machanical grinding→high-temperature hydrothermal drying multi-effect treatment→polydopamine coating→phenolic resin dipping→drying→billet assembling and paving→hot pressing→mechanical sanding→cutting→adhesive coating→billet assembling→cold curing and sodilifying→polydopamine-Ag/$TiO_2$-doped treatment→fasterner fastening→bamboo sleeper.

Tests of the density, UV resistance, water absorption thickness expansion rate, anti-skid performance, bending elastic modulus and horizontal shear strength of the manufactured bamboo sleeper billet were carried out in laboratory, as shown in the FIG. 6, which indicated that the bamboo sleeper manufactured in this example met the requirements of high-value and green sleepers in track construction.

Although the present invention has been disclosed in preferred embodiments above, it is not intended to limit the present invention. Any person skilled in the art may make many possible variants and modifications to the present invention without departing from the scope of the present invention by using the foregoing disclosed technical content, or modify it to equivalent embodiments of equivalent variants. Therefore, any simple amendments, equivalent variants, and modifications made to the foregoing embodiments according to the technical essence of the present invention without departing from the content of the technical solution of the present invention should fall within the scope of protection of the technical solution of the present invention.

What is claimed is:

1. A preparation method of an assembled bamboo sleeper, including the following steps:

step 1) drying and modifying a pretreated bamboo unit by using water vapor with a superheated temperature of 110-80° C., until a water content of the bamboo unit is 8-20%, to obtain a dried and modified bamboo unit; wherein the pretreating in step 1) specifically includes: removing an outer green part and an inner yellow part from the bamboo unit, steaming and softening, and then washing and grinding, to obtain the pretreated bamboo unit;

step 2) dipping the dried and modified bamboo unit in step 1) in a dopamine solution or spraying the dopamine solution thereon, and dried, to obtain a filamentous bamboo unit undergone polydopamine coating treatment;

step 3) dipping the filamentous bamboo unit undergone polydopamine coating treatment in step 2) in an adhesive I to perform adhesive dipping, draining, and drying, until the water content of the bamboo unit is 10%-16%, to obtain a blank;

step 4) curing and solidifying the blanks in step 3), to obtain a bamboo plate;

step 5) assembling and gluing two or more of the bamboo plates in step 4) according to a preset requirement, assembling the bamboo plates, and solidifying, to obtain a bamboo sleeper billet;

step 6) coating a dopamine solution on a surface of the bamboo sleeper billet in step 5), and then performing anti-mildew and/or anti-corrosion and/or anti-insect treatment, to obtain a bamboo sleeper undergone anti-mildew and/or anti-corrosion and/or anti-insect treatment; wherein the anti-mildew and/or anti-corrosion and/or anti-insect treatment in step 6) specifically includes: coating the dopamine solution on a surface of the bamboo sleeper billet and drying, coating a titanyl sulfate solution, drying, and then coating a silver nitrate solution, and drying, to obtain the bamboo sleeper; and step 7) locking and fastening the bamboo sleepers undergone anti-mildew and/or anti-corrosion and/or anti-insect treatment in step 6) by using a fastener, to obtain the assembled bamboo sleeper.

2. The method of claim 1, wherein step 5) specifically includes: finger-jointing two or more bamboo plates in step 4) according to a preset requirement, and coating an adhesive II on upper and lower surfaces of the bamboo plates, assembling the bamboo plates, solidifying the adhesive, and then obtaining the bamboo sleeper billet.

3. The method of claim 2, wherein in step 5), the billets are assembled along the direction of bamboo fibers and/or assembled in a criss-crossed manner along the direction of bamboo fibers.

4. The method of claim 3, wherein step 4) specifically includes: paving and assembling the blanks in step 3), then curing and solidifying the billet by hot pressing, to obtain the bamboo plate, where the hot pressing is carried out at the pressure of 15-30 Mpa and the temperature of 120-160° C.

5. The method of claim 2, wherein the adhesive II is one of polyurethane adhesive, epoxy resin adhesive, and thermosetting reactive polyurethane resin.

6. The method of claim 5, wherein step 4) specifically includes: paving and assembling the blanks in step 3), then curing and solidifying the billet by hot pressing, to obtain the bamboo plate, where the hot pressing is carried out at the pressure of 15-30 Mpa and the temperature of 120-160° C.

7. The method of claim 2, wherein in step 5), before the finger-jointing, the method further includes cutting and sanding the bamboo plates; and the bamboo plates are cut along the direction of the bamboo fibers and/or perpendicular to the direction of the bamboo fibers.

8. The method of claim 7, wherein step 4) specifically includes: paving and assembling the blanks in step 3), then curing and solidifying the billet by hot pressing, to obtain the bamboo plate, where the hot pressing is carried out at the pressure of 15-30 Mpa and the temperature of 120-160° C.

9. The method of claim 2, wherein step 4) specifically includes: paving and assembling the blanks in step 3), then curing and solidifying the billet by hot pressing, to obtain the bamboo plate, where the hot pressing is carried out at the pressure of 15-30 Mpa and the temperature of 120-160° C.

10. The method of claim 1, wherein step 4) specifically includes: paving and assembling the blanks in step 3), then curing and solidifying the billet by hot pressing, to obtain the bamboo plate, where the hot pressing is carried out at the pressure of 15-30 Mpa and the temperature of 120-160° C.

11. The method of claim 10, wherein a time of the hot pressing is t, a thickness of the bamboo plate is D, where $t=D\times2400$, a unit of t is seconds, and a unit of D is mm.

* * * * *